United States Patent
Rahman et al.

(10) Patent No.: US 12,307,198 B1
(45) Date of Patent: May 20, 2025

(54) MULTI-SPEAKER SPEECH SIGNAL TO TEXT SIGNAL VALIDATION

(71) Applicant: Citibank, N.A., New York, NY (US)

(72) Inventors: Sofia Rahman, New York, NY (US); James Myers, New York, NY (US)

(73) Assignee: CITIBANK, N.A., NY (US)

( * ) Notice: Subject to any disclaimer, the term of this patent is extended or adjusted under 35 U.S.C. 154(b) by 0 days.

(21) Appl. No.: 18/945,524

(22) Filed: Nov. 13, 2024

(51) Int. Cl.
  G10L 15/22 (2006.01)
  G06F 40/20 (2020.01)
  G10L 15/26 (2006.01)
  H04N 7/15 (2006.01)

(52) U.S. Cl.
  CPC .............. G06F 40/20 (2020.01); G10L 15/26 (2013.01); H04N 7/155 (2013.01)

(58) Field of Classification Search
  None
  See application file for complete search history.

(56) References Cited

U.S. PATENT DOCUMENTS

| | | | | |
|---|---|---|---|---|
| 9,977,773 B1* | 5/2018 | Birnbaum | ........ | G06Q 10/06398 |
| 2013/0246300 A1* | 9/2013 | Fischer | .................. | G06Q 50/12 |
| | | | | 705/347 |
| 2014/0046891 A1* | 2/2014 | Banas | .................... | G06N 5/022 |
| | | | | 706/46 |
| 2014/0100844 A1* | 4/2014 | Stieglitz | .................. | G06F 40/45 |
| | | | | 704/7 |
| 2015/0249584 A1* | 9/2015 | Cherifi | .................. | H04L 43/065 |
| | | | | 709/224 |
| 2016/0162456 A1* | 6/2016 | Munro | .............. | G06F 16/24532 |
| | | | | 704/9 |
| 2019/0147346 A1* | 5/2019 | Reicher | .................. | G16H 50/20 |
| | | | | 706/11 |
| 2019/0347319 A1* | 11/2019 | Goyal | .................... | G06F 40/174 |
| 2022/0366147 A1* | 11/2022 | Ho | .......................... | G06F 40/35 |
| 2024/0330598 A1* | 10/2024 | Lee | ........................ | G06Q 50/26 |

OTHER PUBLICATIONS

Edwards, Benj, "OpenAI's Transcription Tool Hallucinates. Hospitals are Using it Anyway," Oct. 30, 2024, retrieved Nov. 5, 2024, from https://www.wired.com/story/hospitals-ai-transcription-tools-hallucination/.

* cited by examiner

Primary Examiner — Neeraj Sharma
(74) Attorney, Agent, or Firm — Perkins Coie LLP

(57) ABSTRACT

Systems and methods are disclosed comprising instructions to access audio data of a captured interaction involving one or more participating users of a digital conference tool, receive a first narrative summary of the captured interaction comprising a set of first component narratives, generate a second narrative summary comprising a set of second component narratives, identify at least one component narrative among the set of second component narratives corresponding to the participating users, display the second component narratives of the second narrative summary at a user interface of the participating users, receive user feedback data comprising an adjustment to the displayed text content of the at least one second component narrative, generate a third narrative summary using the user feedback data received from each participating user of the captured interaction, and display the third narrative summary for the captured interaction at the user interface of each participating user.

20 Claims, 11 Drawing Sheets

MULTI-SPEAKER SPEECH SIGNAL TO TEXT SIGNAL VALIDATION

BACKGROUND

A large language model (LLM) is a language model notable for its ability to achieve general-purpose language understanding and generation. LLMs acquire these abilities by learning statistical relationships from text documents during a computationally intensive self-supervised and semi-supervised training process. LLMs can be used for text generation, a form of generative artificial intelligence (GenAI), by taking an input text and repeatedly predicting the next token or word.

Generative artificial intelligence (AI) is a machine learning paradigm capable of generating text, images, videos, or other data using generative models, often in response to prompts. Generative AI models learn the patterns and structure of their input training data and then generate new data that has similar characteristics.

BRIEF DESCRIPTION OF THE DRAWINGS

Detailed descriptions of implementations of the present invention will be described and explained through the use of the accompanying drawings.

Figure 1:
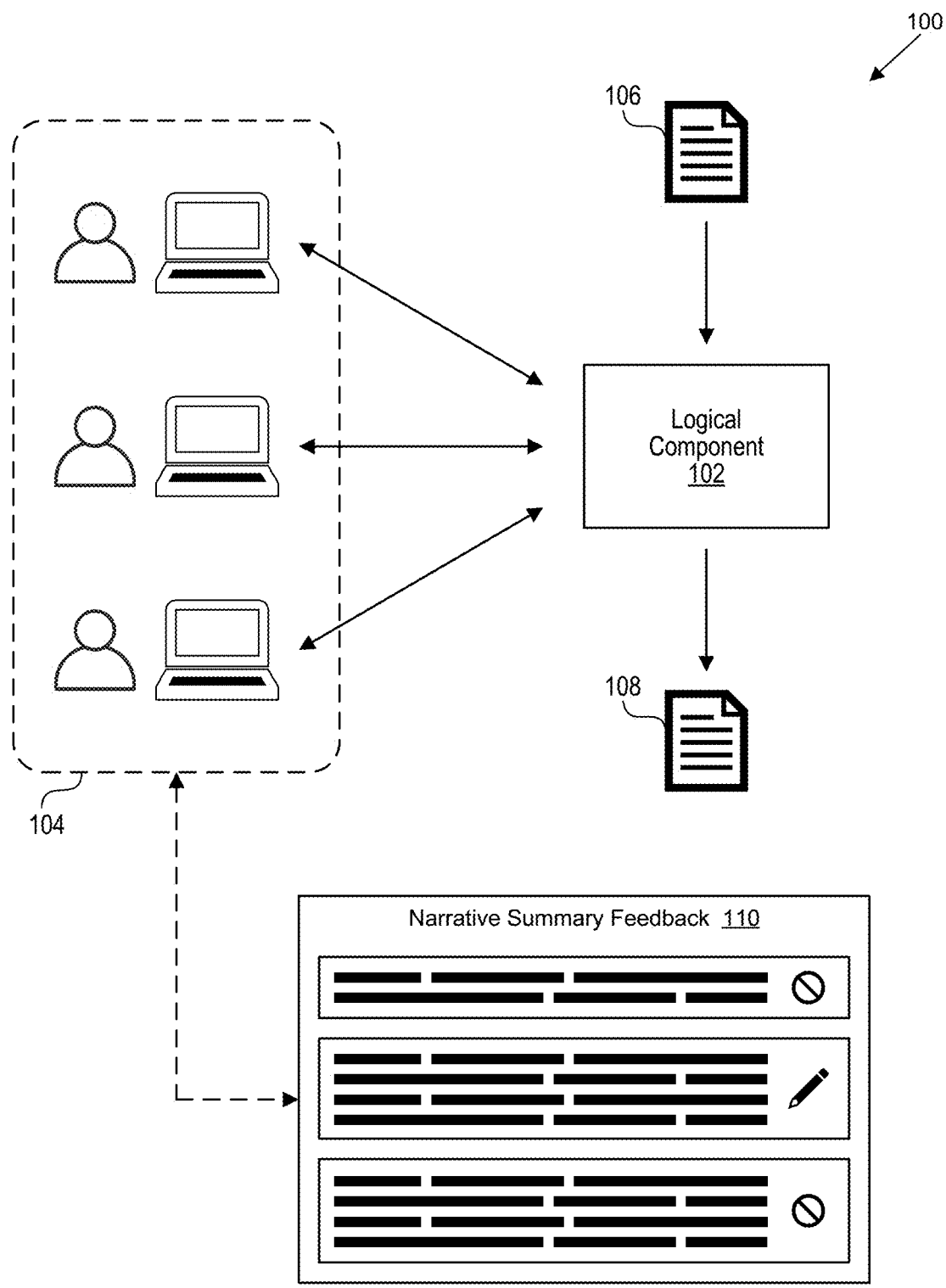
FIG. 1 is a block diagram showing an illustration of a content validation system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Existing systems for generating summarized narratives of audio/video recorded interactions (e.g., digital conference meetings) primarily rely on direct outputs of individual machine learning models (e.g., natural language processing, text-to-speech) to approximate conversion from audio signals (e.g., speech) to alphanumeric signals (e.g., text). Without additional oversight processes to verify accuracy and specificity of narrative contents, this approach often generates summarized narratives with erroneous or inadequate information (e.g., misidentified users, misrepresentation of content, etc.). Manual evaluation and revision of summarized narratives is a time-consuming process that often requires several hours to complete. To further compound this issue, summarized narratives for extended conversations (e.g., long time duration, plurality of speakers, etc.) naturally require additional time for verifying content validity with each participating user. As a result, these and other problems of inefficient manual remediation of inaccurate summarized narratives can significantly diminish the overall user experience, restrict workplace efficiency, and so forth.

Disclosed herein are systems and related methods for augmenting summarized narratives (e.g., core concepts, key takeaways, and/or the like) of audio/video recorded conversations (e.g., digital conference meetings) based on direct feedback aggregated from participating users. The disclosed system maps component narratives (e.g., portions of the summarized narrative) of the recorded conversation to corresponding participating users to verify content accuracy. By providing accurate and substantive summarized narratives, the disclosed system enables participating users to operate efficiently within workplace environments that frequently engage in digital conversations.

The system can generate custom user interfaces enabling participating users to directly modify contents of an initial summarized narrative. As an example, the custom user interface can present contents (e.g., summarized text, audio transcript) of component narratives (e.g., a portion of the initial summarized narrative) corresponding to a participating user at a configurable interface element, enabling the participating user to directly manipulate the presented contents. In response to receiving user feedback from the participating users, the disclosed system can generate a combined narrative that applies the direct changes (e.g., modified text content) onto the component narratives of the initial summarized narrative. In some implementations, the disclosed system can be configured for authenticating and storing the received user feedback via a distributed ledger system (e.g., a blockchain).

In some aspects, the disclosed system provides, via the custom user interfaces, options enabling participating users to indirectly update content of a summarized narrative. For example, the custom user interface presents contents of component narratives not corresponding to the participating user at non-configurable elements, preventing the participating user from directly manipulating the presented contents. Instead, the custom user interface provides users options for appending commentary narratives (e.g., contextual information, flagged erroneous content, and/or the like) separately onto components narratives without manipulating the underlying contents. Accordingly, the disclosed system can revise contents of component narratives based on a set of commentary narratives cumulated across multiple participating users.

In some implementations, the disclosed system can provide, via the custom user interfaces, suggestions and/or guidance to participating users for updating the contents of a summarized narrative. For example, the system can display multiple variations of the summarized narrative, providing users the flexibility to choose how modifications to the summary are applied. In particular, the system can utilize a generative machine learning model to create several versions of the summary that maintain factual accuracy while offering variations in writing styles (e.g., tone, auxiliary details). As an illustrative example, the system provides a concise version focusing on critical information, a detailed version offering additional context, and a balanced version that strikes a middle ground between detailed and concise.

In additional or alternative implementations, the system can alert users of modifications (e.g., adjustment to text content) with high risk of rejection (e.g., low likelihood of incorporation within revised summary). For example, the system compares a user-submitted adjustment of the summarized narrative to one or more evaluation criterions (e.g., editing guidelines) to identify anomalous edits (e.g., outliers) that deviate significantly from the original text content. Accordingly, the system can alert participating users of the identified anomalous edits via visual markings (e.g., highlighted text) corresponding to the problematic user-submitted modifications. In further implementations, the system configures the alert to comprise a message indicating potential risks (e.g., deviation from factual records) of incorporating the identified anomalous edits. In other aspects, the disclosed system can augment summarized narratives by leveraging generative machine learning models. For example, the disclosed system receives data (e.g., voice recordings, video recordings, transcripts, and the like) corresponding to component narratives of a participating user. Using the received data, the disclosed system can update text content of individual component narratives of the summarized narrative, providing additional detail and accurate content. In some implementations, the disclosed system receives visual data (e.g., images, portable document formats, presentation slides, and the like) corresponding to component narratives of the participating user. Accordingly, the disclosed system can use the received visual data in conjunction with the received audio data (e.g., multi-modal) to update the summarized narrative.

Advantages of the disclosed system include a robust content validation workflow for presenting user-specific narrative content (e.g., component narratives corresponding to a user), receiving critical user feedback (e.g., direct and indirect) via customized interfaces, and generating user-reviewed narrative summaries across multiple users. For illustrative purposes, examples are described herein in the context of audio recorded conversations of digital conference tools. However, a person skilled in the art will appreciate that the disclosed system can be applied in other contexts. For example, the disclosed system can be used to streamline general verification processes and quality control involving a plurality of reviewers (e.g., crowdsourcing), each assigned with unique designated tasks.

Attempting to create a system to refine machine learning (ML) generated narrative summaries for captured user interactions in view of the available conventional approaches created significant technological uncertainty. Creating such a system requires addressing several unknowns in conventional approaches of reviewing, and revising, contents of the narrative summaries, such as how to incorporate participant user feedback in evaluating accuracy of generated narrative content. Summarized narratives generated using machine learning tools, such as a generative machine learning model, typically lack an available ground-truth sample for adequate comparison and evaluation of narrative content accuracy. Similarly, conventional approaches in reviewing contents of narrative summaries did not provide methods of collective validation and revision of narrative content using feedback aggregated from participant users of the captured interactions.

Conventional approaches for generating narrative summaries rely on direct output predictions (e.g., sequences of alphanumeric tokens) of machine learning models (e.g., a natural language model), which are insufficient in validating the accuracy of narrative contents with respect to the source material. For example, a conventional system may invoke a natural language processing model to generate a predicted sequence of alphanumeric tokens based on an input transcript and subsequently fail to accurately capture key objectives and/or factual details described within the source transcript. Conventional approaches to revising generated narrative summaries typically involve iterative updates to an initial narrative output using additional machine learning model predictions, which do not resolve the lack of a content validation process. Conversely, the disclosed system intelligently generates revised versions of a narrative summary using direct participant user feedback to identify correct content information and exclude erroneous details.

To overcome the technological uncertainties, the inventors systematically evaluated multiple design alternatives. For example, the inventors tested various machine learning algorithms and integrative system designs to determine which would be most effective for user validated augmentation of narrative summaries. The inventors experimented with custom graphical user interfaces (GUIs) that enable participant users to directly modify (e.g., edit, comment, and/or the like) component narratives (e.g., portions of the narrative summary) assigned to each user. These custom graphical interface features allowed the inventors to configure machine learning models with sufficient precision to generate new iterations of narrative summaries that accurately reflect source material and intended representations of the participant users.

However, the restricting user modifications to individually assigned component narratives proved to be inadequate for generating summarized narratives that achieved strong consensus on content accuracy across participant users. Specifically, this approach failed to accurately capture representations of component narratives that appealed to broader groups of participant users, leading to significant divergence in content validation among the participants.

Thus, the inventors experimented with different methods for retrieving narrative content feedback from participant users. For example, the inventors configured custom GUIs to enable participant users to append commentary notes (e.g., auxiliary information) on restricted component narratives (e.g., user prohibited from direct content modification) and further reassign component narratives to other participant users (e.g., transfer of authority) to identify the most efficient and effective approaches. Additionally, the inventors systematically evaluated different strategies for assessing broad content accuracy of generated narrative summaries across multiple participant users. The inventors evaluated, for example, different methods of approximating a consensual validation of content accuracy from participant users, such as calculating a collective evaluation metric based on an aggregation of individual ratings (e.g., accuracy rating, content validity scores, and/or the like) of component narratives.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

System Overview

FIG. 1 is a block diagram showing an illustration of a content validation system 100 ("system 100") that can implement aspects of the present technology. The system 100 can comprise a logical component 102 that is configured to generate summarized content 106 from an initial data source. In some implementations, the logical component 102 can be configured to generate an initial narrative summary using data (e.g., audio signal data, visual signal data, alphanumeric data, and/or the like) from a captured interaction (e.g., a recorded conversation of participant users via a digital conferencing tool) between one or more end-users 104. The system 100 can communicatively couple the logical component 102 to user devices of the one or more end-users 104 involved within the captured interaction, enabling users to review the initial summarized content 106 via a custom Graphical User Interface (GUI) layout. For example, the system 100 can enable end-users 104 to submit feedback information (e.g., content correction, commentary notes, flagged errors, and/or the like) for improving the initial summarized content 106 (e.g., narrative summaries) via a custom feedback interface 110. Accordingly, the system 100 can configure the logical component 102 to generate a revised summarized content 108 (e.g., a revised narrative summary) using the user submitted feedback information. In some implementations, the system 100 can configure the logical component 102 to validate the revised summarized content 108 against one or more evaluation criteria (e.g., content verification metrics, predetermined content rules, and/or the like). In response to the revised summarized content 108 failing to satisfy the evaluation criteria, the logical component 102 can be configured to iteratively repeat execution (e.g., a feedback loop) of generating new revised summarized content 108 via obtaining new user feedback information via the custom feedback interface 110. In various implementations, the logical component 102 can be configured to incorporate contextual analysis using related prior summarized content and/or user submitted feedback information. Logical component 102 can be one or more of: a data model, a machine learning model, a computer program, or other logical components configured for receiving, transmitting, analyzing, or aggregating user content—and/or processing—related data.

Content Validation System

Figure 2:
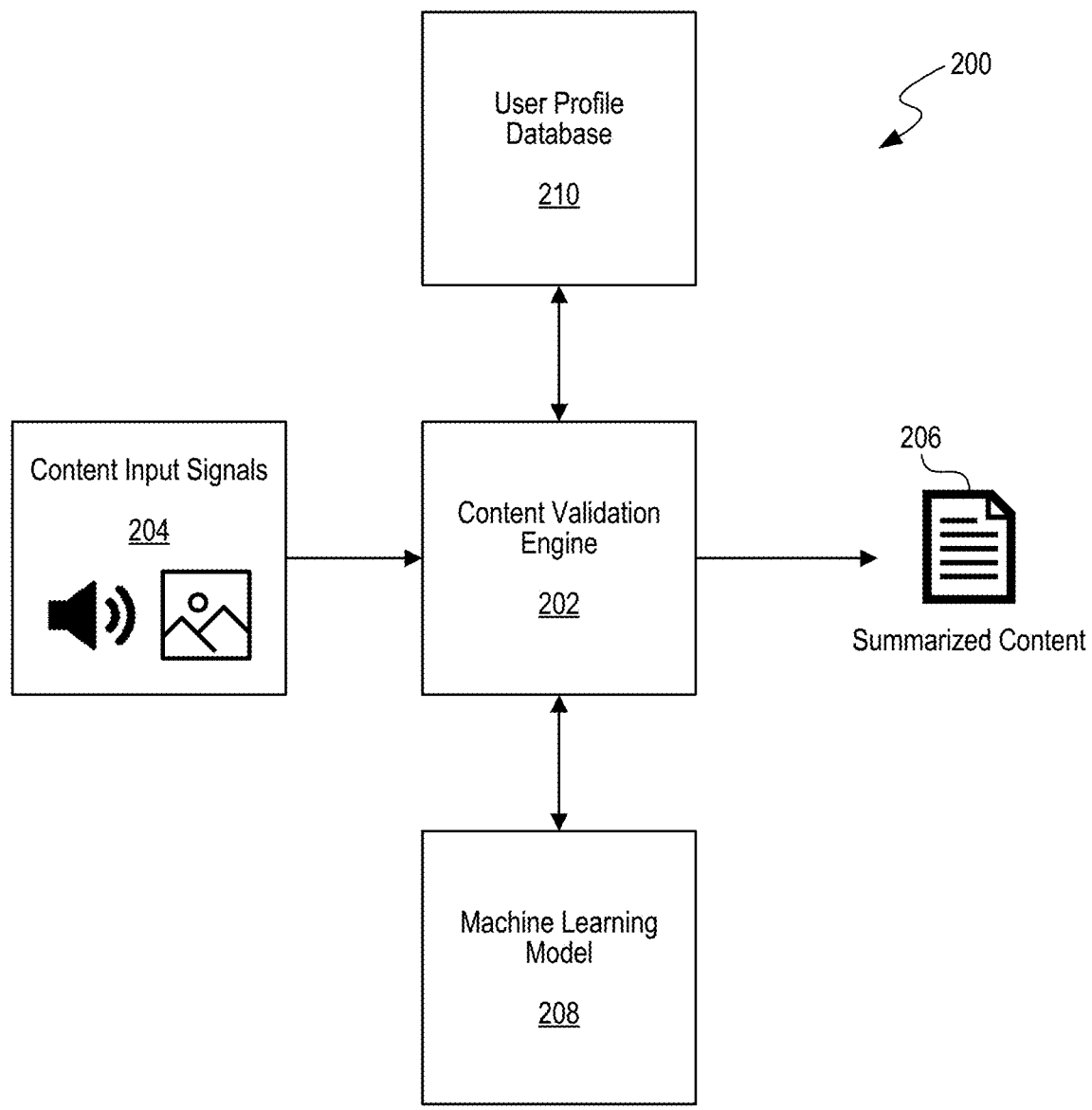
FIG. 2 is a block diagram illustrating an example content generation process of a content validation system, in accordance with some implementations of the present technology.

FIG. 2 is a block diagram illustrating an example content generation process of a content validation system, in accordance with some implementations of the present technology. The process 200 can be performed via a content validation engine 202 configured to execute one or more operations involving content input signals 204, summarized content 206, machine learning model 208, and user profile database 210. Content validation engine 202, machine learning model 208, and user profile database 210 are implemented using components of example devices 700, computing devices 820, and storage devices 825 illustrated and described in more detail with reference to FIG. 7 and FIG. 8, respectively. Likewise, implementations of example process can include different and/or additional components or can be connected in different ways.

The content validation engine 202 can be configured to generate the summarized content 206 using the content input signal 204, or relevant user content information for creating the summarized content 206. As an illustrative example, the content validation engine 202 can access audio signal data (e.g., raw audio signals, a corresponding transcript, and/or the like) of a captured interaction (e.g., recorded conversation, live interaction, etc.) involving one or more participant users (e.g., of a digital conference tool). In other implementations, the content validation engine 202 can be configured to access and/or incorporate visual signal data (e.g., an image, an electronic document, a presentation slide, and/or the like) along with the audio signal data to enable a multi-modal generation of the summarized content 206.

Using the accessed audio signal data, the content validation engine 202 can generate the summarized content 206 as an output of the machine learning model 208. In some implementations, the content validation engine 202 can use the machine learning model 208 to generate an alphanumeric text transcript corresponding to the audio signal data. In other implementations, the content validation engine 202 can prompt a generative machine learning model (e.g., a large language model, a question-answer model, and/or the like) to create a summarized narrative for the captured interaction that includes a set of component narratives each corresponding to (e.g., and/or associated with) one or more participant users.

In additional or alternative implementations, the content validation engine 202 can use the machine learning model 208 to further refine an initial summarized content 206 of the content input signal 204. For example, the content validation engine 202 can be configured to use a first generative machine learning model to determine a first narrative summary based on the accessed audio data. Further, the content validation engine 202 can use a second (e.g., or the first) generative machine learning model to create a second narrative summary based on the first narrative summary of the audio signal data.

In some implementations, the content validation engine 202 can be configured to use augmented variations of the accessed audio signal data to further refine the second narrative summary via the machine learning model 208. For example, the content validation engine 202 can use a filtered set of audio signal data corresponding to one or more target participant users when adjusting specific contents of the second narrative summary. In particular, the content validation engine 202 can identify one or more second component narratives of the second narrative summary that correspond to at least one target participant user. Accordingly, the content validation engine 202 can determine at least one portion of the accessed audio signal data that corresponds to the identified second component narratives. Using the determined portions of the accessed audio signal data, the content validation engine 202 can generate a new version of the second narrative summary (e.g., via the machine learning model 208) that updates the text contents of the second component narratives.

In other implementations, the content validation engine 202 can employ additional data refinement methods to augment the output summarized content 206 of the machine learning models 208. For example, the content validation engine 202 can, prior to generating summarized contents 206, apply audio analysis methods (e.g., speaker diarization, sentiment detection, and/or the like) to augment the audio signal data, which enhances the metadata of the original audio signal data and provides additional user-specific content to the machine learning models 208. As another example, the content validation engine 202 can access, from a remote user profile database 210, historical context information (e.g., user content preferences, prior captured interactions associated with user, and/or the like) for one or more target participant users, enabling generation of summarized content 206 with user personalized details. In some implementations, the historical context information can comprise one or more of a prior narrative summary, a prior set of component narratives, a preferred communication style of the target participant user, and so on.

Figure 3:
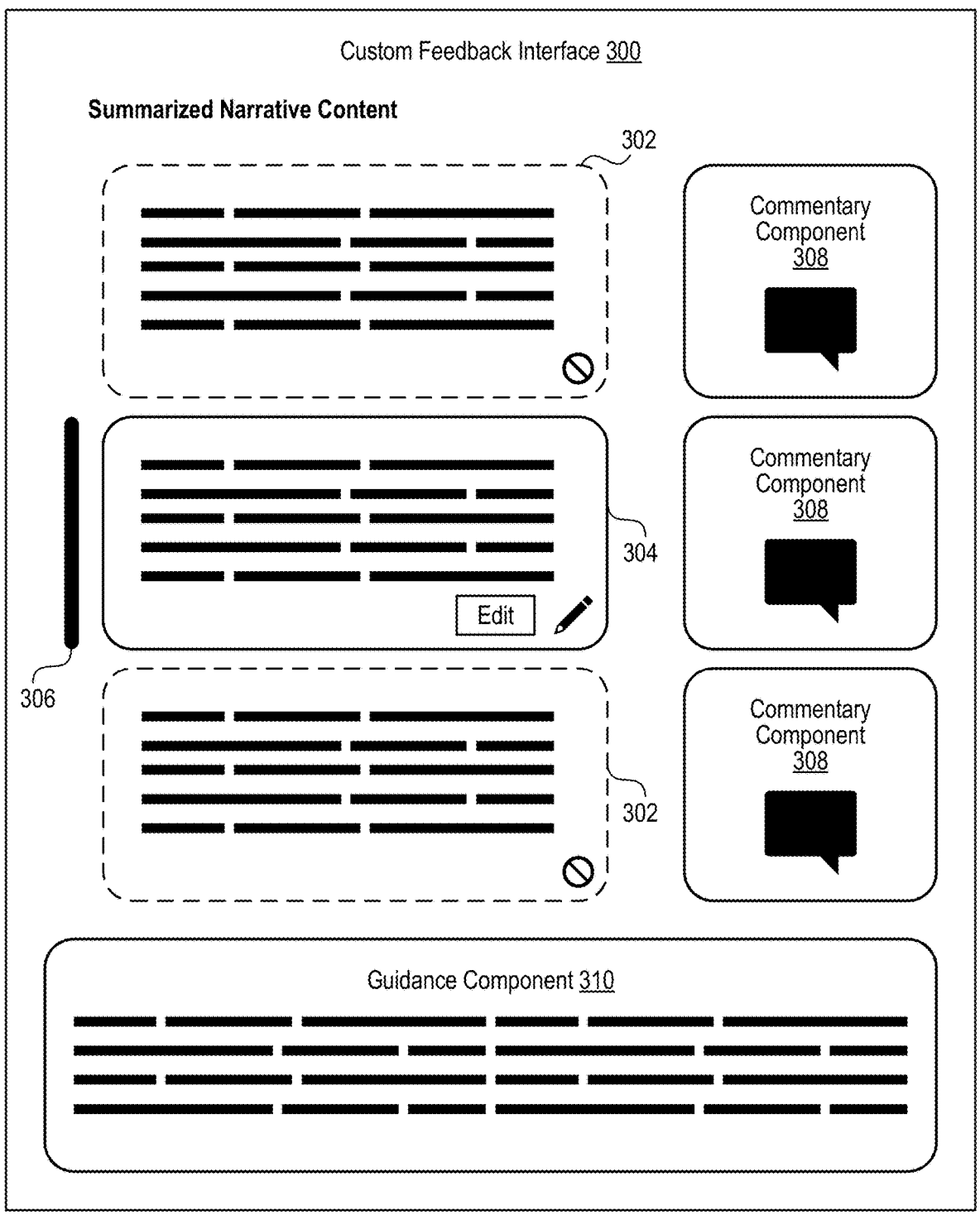
FIG. 3 is a block diagram illustrating example components of a custom feedback interface of a content validation system, in accordance with some implementations of the present technology.

FIG. 3 is a block diagram illustrating example components of a custom feedback interface 300 of a content validation system, in accordance with some implementations of the present technology. The custom feedback interface 300 ("interface 300") includes a configurable component 302, a non-configurable component 304, a visual marking 306, a commentary component 308, and a guidance component 310. The content validation engine described herein is the same as, or similar to, the content validation engine 202 illustrated and described in more detail with reference to FIG. 2. Likewise, implementations of example components of the custom feedback interface 300 can include different and/or additional components or can be connected in different ways.

The content validation engine can be configured to obtain user feedback information to further refine, and improve, summarized contents (e.g., generated via machine learning models) of a captured interaction. In particular, the content validation engine can configure a custom feedback interface 300 to uniquely display narrative summaries to each participant user of the captured interaction. For each participant user, the content validation engine can identify at least one component narrative from the narrative summaries that are assigned, or correspond, to the participant user (e.g., contents of component narrative involve or relate to user audio signal data). The content validation engine can generate, and display, a custom feedback interface 300 comprising the second component narrative contents at a user interface of the participant user. Accordingly, the custom feedback interface 300 can enable the participant user to submit user feedback information (e.g., adjustments to displayed component narrative text content) to the content validation engine for revising, or updating, narrative summaries.

In some implementations, the content validation engine can personalize the custom feedback interface 300 for each individual participant user. For example, the content validation engine can configure the interface 300 to display contents of component narratives corresponding to a target participant user (e.g., user assigned components) at a configurable interface component 302 (e.g., user editable interface element), enabling the target participant user to directly adjust text contents of the component narratives. In additional or alternative implementations, the configurable interface component 302 of the interface 300 can further comprise a visual marking 306 indicating text content the participant user is authorized to adjust, such that the visual marking 306 separates the displayed component narrative corresponding to the participant user from displayed component narratives not corresponding to the participant user.

In other implementations, the content validation engine can configure the interface 300 to display contents of component not corresponding to the participant user at a non-configurable interface component 304 (e.g., fixed interface elements), prohibiting the participant user from adjusting text content of the component narratives.

In other implementations, the content validation engine can configure the interface 300 to comprise commentary components 308 that enable participant users to append non-direct suggestions to displayed component narratives. For example, the commentary component 308 of the interface 300 can enable users to add one or more commentary narratives to both component narratives corresponding to the participant user and component narratives not corresponding to the participant user. In some implementations, a commentary narrative can comprise an indication of content error, content clarification, a misidentified participant user, or a combination thereof.

In further implementations, the content validation engine can configure the interface 300 to enable participant users to reassign component narratives to another participant user. For example, the content validation engine can receive, from a user interface of a first participant user, a selection for reassigning at least one component narrative from the first participant user to a second participant user (e.g., user not corresponding to the component narrative). Accordingly, the content validation engine can update the display of the reassigned component narrative for the second participant user by changing the interface component for the component narrative from a non-configurable interface component 304 to a configurable interface component 302. As a result, the updated display interface component enables the second participant user to directly adjust contents of the reassigned component narrative.

In some implementations, the content validation engine can configure the interface 300 to comprise a user guidance component 310 that provides participant users with suggested edits (e.g., recommended content adjustments) and/or notification alerts (e.g., rejection probabilities for proposed adjustments) when directly interacting with configurable interface components 302. As an illustrative example, the guidance component 310 of the interface 300 can be configured to provide participant users (e.g., at the user interface) a plurality of different summarized content versions. In particular, the guidance component 310 enables participant users to browse multiple variations of narrative summaries (e.g., generated using machine learning models) that maintain a static subject corpus (e.g., consistent core topics of narrative summaries) while introducing deviations in writing style (e.g., tone, level of detail, and/or the like). For example, the guidance component 310 can be configured to provide three variations of a select narrative summary, such as a concise version (e.g., brief, focus on critical information), a detailed version (e.g., in-depth information, optional contexts), or a balanced version. In additional or alternative implementations, the content validation engine can use a generative machine learning model to generate, and display, narrative explanations for edit suggestions (e.g., recommendation insights) provided at the guidance component 310.

In other implementations, the content validation engine can configure the guidance component 310 of the interface 300 to generate notification alerts for a participant user. In one aspect, the guidance component 310 can be configured to highlight potential risks of user adjustment failures (e.g., rejection of user edits) for one or more component narratives. For example, the guidance component 310 (e.g., or other interface elements) can highlight user-submitted edits that significantly deviate from the original contents of the summarized narratives and/or additional evaluation criterions (e.g., corporate response guidelines, standardized summary formatting, and/or the like). In further implementations, the guidance component 310 can be configured to provide a narrative explanation for the identified risks of rejection, such as identifying misalignment between user-submitted edits and factual records (e.g., removal of core topics, omission of critical actions or decisions), potential for causing confusion within other participant users, or other reasons that significantly degrade diagnostic utility of the summarized narrative.

In additional or alternative implementations, the content validation engine can implement a version control protocol for incorporating and/or storing user feedback information received from the interface 300. For example, in response to receiving user feedback data comprising proposed adjustments to component narratives of a first version of a narrative summary, the content validation engine can be configured to access the first version of a narrative summary from a remote database 815, 825. Accordingly, the content validation engine can display the first version of the narrative summary and the received user feedback data at a user interface of an authorized user (e.g., version control maintenance staff). In some implementations, the content validation engine can display the received user feedback data at a visual interface element comprising one or more visual markings representative of the proposed adjustments to component narratives of the first version of the narrative summary. In response to receiving an authorization signal (e.g., approved content merge) from the authorized user for incorporating the received user feedback data into the narrative summary, the content validation engine can generate a second version of the narrative summary that incorporates the proposed adjustments to component narratives of the first version of the narrative summary. Accordingly, the content validation engine can store the second version of the narrative summary at the remote database 815, 825.

In further implementations, the content validation engine can be configured to generate a verification artifact (e.g., a hash signature) corresponding to an approved version change for a narrative summary. For example, the content validation engine can access a set of identifiers for the second version of the narrative summary, such as a timestamp, a version control number, an identifier for the authorized user, an identifier of a participant user, contents of the first version of the narrative summary, contents of the second version of the narrative summary, contents of the user feedback data, or a combination thereof. Using the accessed set of identifiers, the content validation engine can generate a unique authenticity token (e.g., via a hash function) that verifies the generation of the second version of the narrative summary. In additional or alternative implementations, the content validation engine can be configured to store user feedback data received from the interface 300 at a distributed ledger (e.g., a blockchain) such that entries in the distributed ledger corresponds component narratives to associated metadata.

Figure 4:
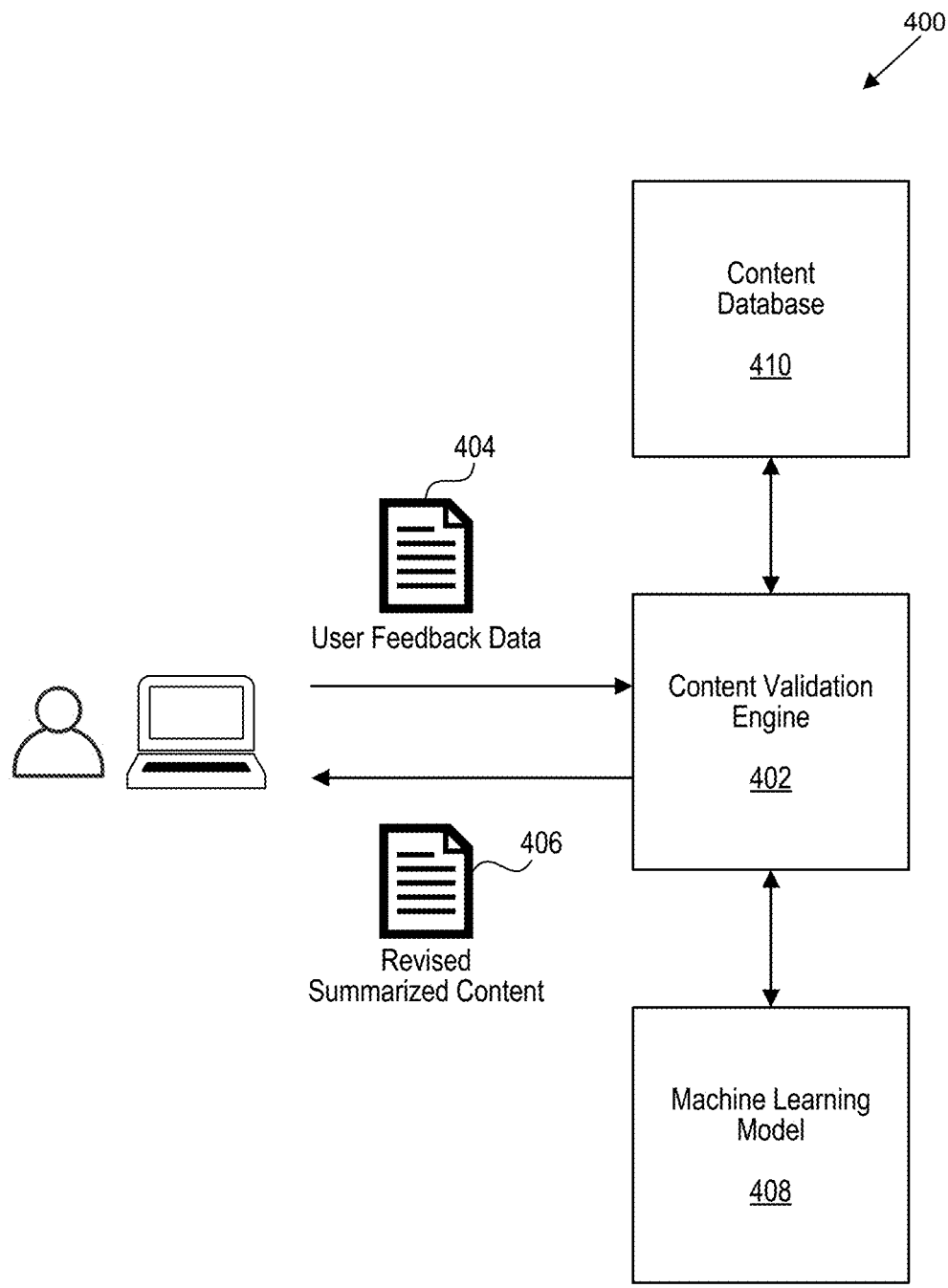
FIG. 4 is a block diagram illustrating an example incremental feedback adjustment process of a content validation system, in accordance with some implementations of the present technology.

FIG. 4 is a block diagram illustrating an example incremental feedback adjustment process 400 of a content validation system, in accordance with some implementations of the present technology. The process 400 can be performed via a content validation engine 402 (same as, or similar to, the content validation engine 202) configured to execute one or more operations involving user feedback data 404, revised summarized content 406, machine learning model 408 (same as, or similar to, the machine learning model 208), and content database 410. Content validation engine 402, machine learning model 408, and content database 410 are implemented using components of example devices 700, computing devices 820, and storage devices 825 illustrated and described in more detail with reference to FIG. 7 and FIG. 8, respectively. Likewise, implementations of example process 400 can include different and/or additional components or can be connected in different ways.

The content validation engine 402 can be configured to generate a revised summarized content 406 (e.g., narrative summaries of captured interactions) using user feedback data 404. For example, the content validation engine 402 can be configured to receive user feedback data 404 (e.g., adjustments to narrative component text, commentary notes) from participant users via the custom feedback interface 300. Using the user feedback data 404, the content validation engine 402 can use a machine learning model 408 (e.g., generative machine learning models) to create a revised summarized content 406. Accordingly, the content validation engine 402 can display the revised summarized content 406 at the user interface (e.g., custom feedback interface 300) of each participant user of the captured interaction.

In other implementations, the content validation engine 402 can be configured to incrementally generate a revised summarized content 406 using user feedback data 404. For example, the content validation engine 402 can receive a set of validation ratings (e.g., a numerical score, a categorical rating, and/or the like) from at least one participant user that indicate an approximate content accuracy for component narratives of a narrative summary. Accordingly, the content validation engine 402 can compare the set of validation ratings to one or more inaccuracy thresholds (e.g., content error tolerance) associated with the narrative summary. In response to one or more critical validation ratings exceeding the inaccuracy threshold, the content validation engine 402 can identify a set of target participant users corresponding to the critical validation ratings. For each target participant user, the content validation engine 402 can using the critical validation ratings to identify at least one critical component narrative that corresponds to the target participant user. Likewise, the content validation engine 402 can display the at least one critical component narrative at the user interface of the target participant user. Accordingly, the content validation engine 402 can use new user feedback data 404 received from each target participant user (e.g., via the user interface) to generate a new revised summarized content 406 (e.g., updated narrative summary). The content validation engine 402 can also display the revised summarized content 406 at the user interface of each participant user, including users excluded from the set of target participant users. The foregoing methods and processes for incremental updates to the summarized content 406 can be continuously repeated until validation ratings of participant users are within the inaccuracy threshold or other relevant evaluation metrics.

In other implementations, the content validation engine 402 can deploy a collective verification process to evaluate content accuracy of a revised summarized content 406. For example, the content validation engine 402 can determine a collective evaluation metric for each individual component narrative of the revised summarized content 406 using an aggregation of user feedback data. In particular, the content validation engine 402 can receive (e.g., via a user interface) a validation rating (e.g., a numerical score, a categorial rating, and/or the like) from each participant user assigned to the individual component narrative. Accordingly, the content validation engine 402 can combine the user submitted validation ratings into a collective evaluation metric (e.g., a user verification count, a consensus proportion, and/or the like) that indicates an approximate content accuracy agreed upon by a set of participant users assigned to the individual component narrative. In a further example, the content validation engine 402 can aggregate the user submitted validation ratings to determine a feedback divergence score (e.g., a similarity regression, a standard deviation, and/or the like) that indicates an approximate alignment (e.g., agreement and/or disagreement) of content evaluations between the participant users.

In further implementations, the content validation engine 402 can iteratively generate revised summarized contents 406 using the collective evaluation metrics (e.g., and feedback divergence scores) of individual component narratives. For example, the content validation engine 402 can compare the collective evaluation metric (e.g., or feedback divergence score) of a select component narrative to a consensus threshold (e.g., a minimum user verification count, a target consensus range, and/or the like) to determine approximate satisfaction of content accuracy for the select component narrative. In response to the collective evaluation metric (e.g., or feedback divergence score) of at least one component narrative failing to satisfy the consensus threshold, the content validation engine 402 can display (e.g., at the user interfaces of participant users) the at least one component narrative and a corresponding visual marking (e.g., a cross, a warning symbol) indicating a failed collective content verification. The content validation engine 402 can further request, and receive, new user feedback data 404 from participant users assigned to the at least one component narrative. Accordingly, the content validation engine 402 can use the received user feedback data 404 to generate a new revised summarized content 406. In response to the collective evaluation metrics (e.g., or feedback divergence scores) of each component narrative satisfying the consensus threshold, the content validation engine 402 can display (e.g., at the user interfaces of participant users) the revised summarized content 406 and a corresponding visual marking (e.g., a checkmark) indicating collective content verification. In additional or alternative implementations, the content validation engine 402 can store the revised summarized content 406 at a remote content database 410 in response to collective content verification.

Figure 5:
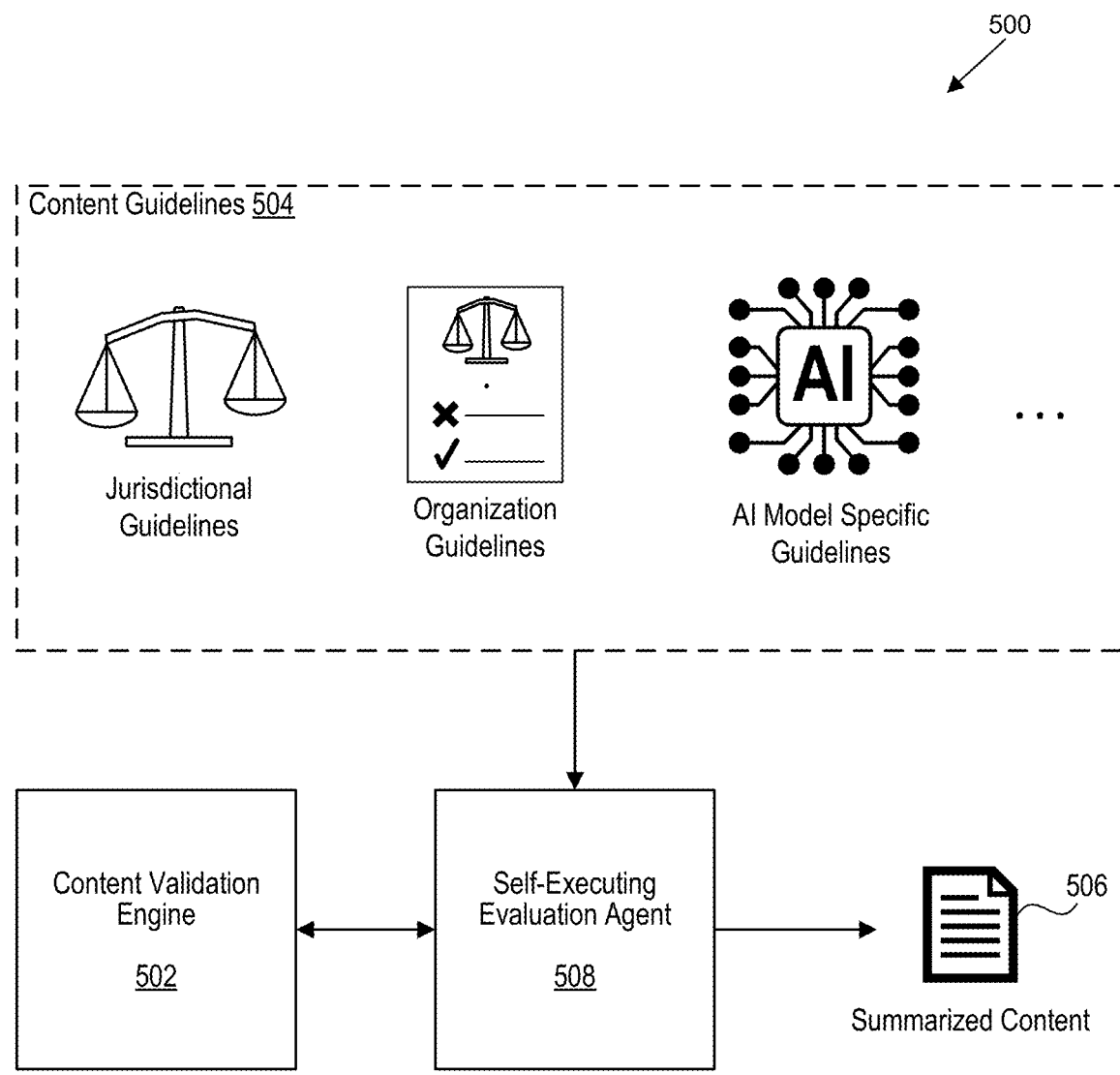
FIG. 5 is a block diagram illustrating an example compliance verification process of a content validation system, in accordance with some implementations of the present technology.

FIG. 5 is a block diagram illustrating an example compliance verification process 500 of a content validation system, in accordance with some implementations of the present technology. The process 500 can be performed via a content validation engine 502 (same as, or similar to, the content validation engine 202) configured to execute one or more operations involving predefined content guidelines 504, summarized content 506, and a self-executing evaluation agent 508. Content validation engine 502 and self-executing evaluation agent 508 (referred to as "agent 508") are implemented using components of example devices 700 and computing devices 820 illustrated and described in more detail with reference to FIG. 7 and FIG. 8, respectively. Likewise, implementations of example process 500 can include different and/or additional components or can be connected in different ways.

The content validation engine 502 can be configured to evaluate compliance of a summarized content 506 with one or more predefined content guidelines 504 (e.g., regulatory guidelines, organization rules, model-specific definitions, standardized objectives, target performance metrics, branding, and/or the like). For example, the content validation engine 502 can access one or more evaluation criterions from a predefined content guideline 504 that correspond to content requirements for generated summarized content 506 (e.g., a narrative summary of a captured interaction). In response to the contents of the summarized content 506 failing to satisfy the evaluation criterions, the content validation engine 502 can generate (e.g., via a generative machine learning model) a revised version of the summarized content 506 that satisfies the evaluation criterions. For example, the content validation engine 502 can prompt a generative machine learning model to create a revised summarized content 506 using a contextual prompt component (e.g., chain-of-thought, additional prompt details) to incorporate the evaluation criterions of the predefined content guideline 504. Accordingly, the content validation engine 502 can display the revised summarized content 506 at the user interface of each participant user of the captured interaction.

In additional or alternative implementations, the content validation engine 502 can configure, and deploy, a self-executing evaluation agent 508 (e.g., an autonomous program and/or process) to evaluate compliance of summarized content 506 to predefined content guidelines 504. For example, the agent 508 can be configured to automatically run one or more of the foregoing evaluation processes performed by the content validation engine 502. Further, the agent 508 can be configured to generate, and display, edit recommendations (e.g., suggested adjustments to component narrative contents) for participant users to enable compliance with predefined content guidelines 504. As an illustrative example, the agent 508 can be configured to evaluate whether the summarized content 506 comprises clear and unaltered original statements of participant users. In another example, the agent 508 can evaluate whether contents of the summarized content 506 focus on describing core topics and/or action items succinctly (e.g., exclusion of unnecessary details). In a further example, the agent 508 can assess whether essential content (e.g., action items, core discussion topics, and/or the like) are included in the summarized content 506 and non-essential content (e.g., off-topic conversations, personal remarks, redundant comments) are omitted (e.g., truncated).

Figure 6:
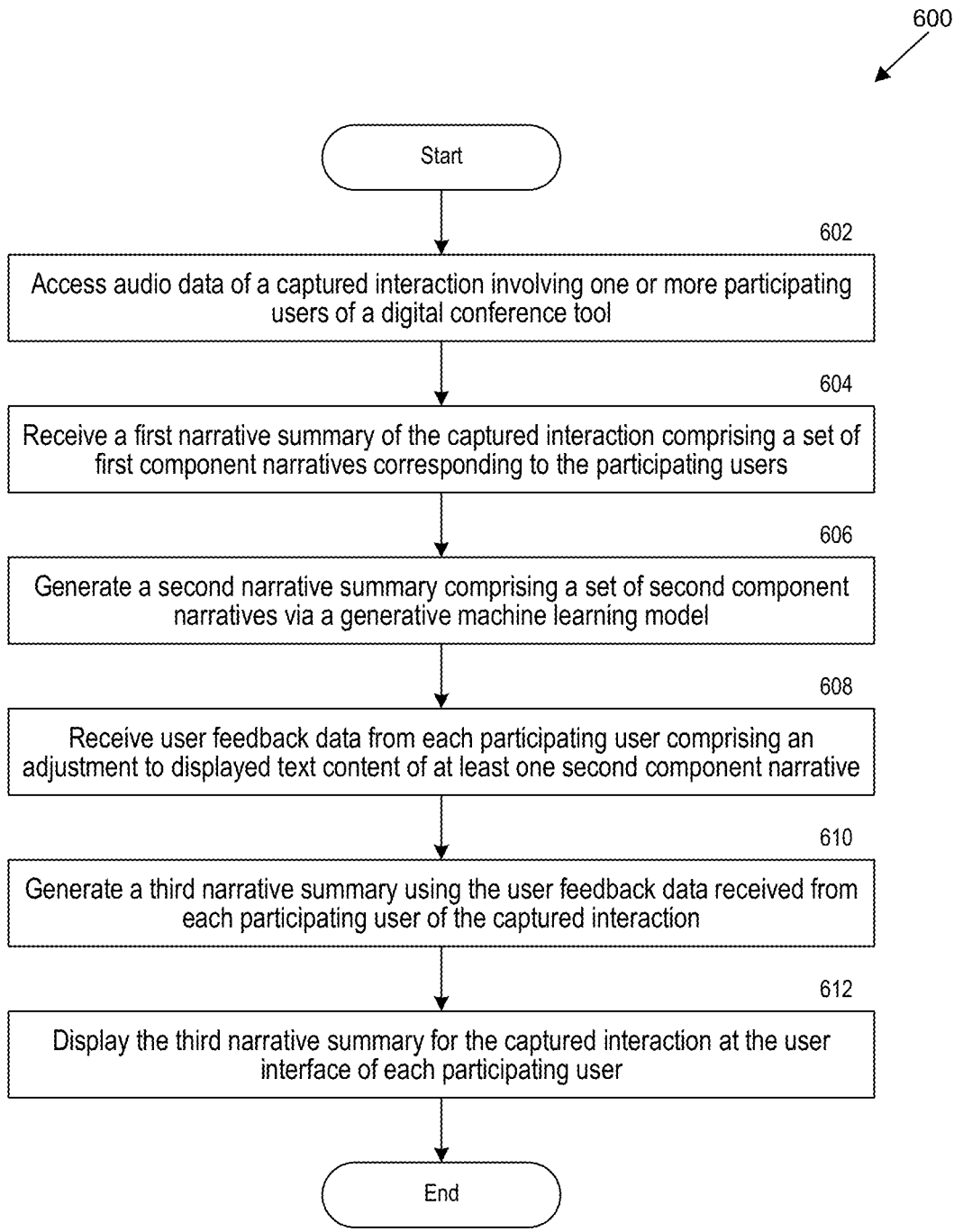
FIG. 6 is a flow diagram that illustrates a process to generate feedback augmented narrative summaries in some implementations.

FIG. 6 is a flow diagram that illustrates a process to generate feedback augmented narrative summaries in some implementations. The process 600 can be performed by a system (e.g., content validation system 100) configured to adjust model generated narrative summaries based on user feedback information. In one example, the system includes at least one hardware processor and at least one non-transitory memory storing instructions, which, when executed by the at least one hardware processor, cause the system to perform the process 600. In another example, the system includes a non-transitory, computer-readable storage medium comprising instructions recorded thereon, which, when executed by at least one data processor, cause the system to perform the process 600.

At 602, the system can be configured to access audio data of a captured interaction involving one or more participating users of a digital conference tool. In some implementations, the system can determine a mapping between one or more portions of the accessed audio data to the one or more participating users of the captured interaction. In additional or alternative implementations, the system can be further configured to access supplementary visual data corresponding to the accessed audio data. In some implementations, the supplementary visual data can comprise an image, a shared document, an electronic file, a presentation slide, or a combination thereof.

At 604, the system can be configured to receive a first narrative summary of the captured interaction. For example, the system can use a first generative machine learning model to create a first narrative summary comprising a set of first component narratives each corresponding to and associated with at least one participating user of the digital conference tool. In some implementations, the system can generate a mapping between the set of first component narratives of the captured interaction to the one or more portions of the accessed audio data.

At 606, the system can be configured to generate a second narrative summary of the captured interaction. For example, the system can use via a second generative machine learning model to create a second narrative summary comprising a set of second component narratives using the accessed audio data and/or the first narrative summary. In some implementations, the system can be configured to reuse the first generative machine learning model to create the second narrative summary.

In some implementations, the system can be configured to update the set of second component narratives using the accessed audio data. For example, the system can select at least one participating user of the digital conference tool from the captured interaction. Accordingly, the system can identify one or more second component narratives corresponding to the at least one participating user. Additionally, the system can determine at least one portion of the accessed audio data corresponding to the at least one participating user. As a result, the system can update, via the second generative machine learning model, the one or more second component narratives based on the determined at least one portion of the accessed audio data and text content of the one or more component narratives.

At 608, the system can be configured to receive user feedback data for the second narrative summary from each participating user of the captured interaction. For example, the system can identify, from the second narrative summary, at least one component narrative among the set of second component narratives corresponding to a participating user. At a user interface of the participating user, the system can display the second component narratives of the second narrative summary. Accordingly, the system can receive, via the user interface, user feedback data from the participating user comprising an adjustment to the displayed text content of the at least one second component narrative.

In some implementations, the system can be configured to display the at least one second component narrative at a configurable interface element enabling the participating user to adjust text content of the at least one component narrative. In other implementations, the system can be configured to display second component narratives not corresponding to the participating user at a non-configurable interface element prohibiting the participating user from adjusting text content of the second component narratives not corresponding to the participating user. In additional or alternative implementations, the system can configure the display of the at least one second component narrative to comprise a visual marking indicating text content the participating user is authorized to adjust such that the visual marking separates the at least one second component narrative from displayed second component narratives not corresponding to the participating user.

In other implementations, the system can receive, from participating users, user feedback data comprising a set of commentary narratives corresponding to the at least one second component narrative corresponding to the participating user, at least one component narrative of the second narrative summary not corresponding to the participating user, or a combination thereof. In additional or alternative implementations, the set of commentary narratives can comprise one or more commentary narratives with an indication of content error, content clarification, a misidentified participating user, or a combination thereof.

In some implementations, the system can be configured to reassign component narratives from a first participating user to a second participating user. For example, the system can be configured to receive, via the user interface of the first participating user, a selection from the first participating user for reassigning the at least one second component narrative from the first participating user to a second participating user of the captured interaction. In some implementations, the at least one second component narrative does not correspond to the second participating user. Accordingly, the system can display, at the user interface of the second participating user, the at least one second component narrative such that the interface element displaying the at least one second component narrative is changed from a non-configurable interface element to a configurable interface element, enabling the second participating user to adjust text content of the at least one component narrative.

In some implementations, the system can be configured to enable version control of the generated narrative summary and received user feedback data. For example, the system can access a first version of the second narrative summary from a remote database such that the received user feedback data comprise proposed adjustments to second component narratives of the first version of the second narrative summary. Accordingly, the system can display, at a user interface of an authorized user, the first version of the second narrative summary and the received user feedback data such that the received user feedback data is displayed at a visual interface element comprising one or more visual markings representative of the proposed adjustments to second component narratives of the first version of the second narrative summary. In response to receiving an authorization signal from the authorized user for incorporating the received user feedback data into the second narrative summary, the system can generate a second version of the second narrative summary such that the second version of the second narrative summary applies the proposed adjustments to second component narratives of the first version of the second narrative summary. The system can also store the second version of the second narrative summary at the remote database.

In other implementations, the system can access a set of identifiers for the second version of the second narrative summary such that the set of identifiers comprises a timestamp, a version control number, an identifier for the authorized user, an identifier of a participating user, contents of the first version of the second narrative summary, contents of the second version of the second narrative summary, contents of the user feedback data, or a combination thereof. Using the accessed set of identifiers, the system can generate a unique authenticity token verifying the generation of the second version of the second narrative summary. In additional or alternative implementations, the system can store the received user feedback data at a distributed ledger such that entries in the distributed ledger corresponds component narratives and associated metadata.

At 610, the system can be configured to generate a third narrative summary using the user feedback data received from each participating user of the captured interaction. For example, the system can use a generative machine learning model to create a new narrative summary based, at least in part, on the second narrative summary and the received user feedback data. Accordingly, at 612, the system can be configured to display the third narrative summary for the captured interaction at the user interface of each participating user.

In some implementations, the system can be configured to receive a set of validation ratings for the third narrative summary from the one or more participating users, such that each validation rating indicating approximate content accuracy for third component narratives of the third narrative summary. In response to determining that the set of validation ratings exceed an inaccuracy threshold, the system can identify a set of target participating users corresponding to critical validation ratings. In further implementations, the system can receive additional user feedback data from each target participating user of the captured interaction. For example, the system can use the critical validation ratings to identify at least one third component narrative of the third narrative summary corresponding to a target participating user. At a user interface of the target participating user, the system can display the at least one third component narrative. Accordingly, the system can receive, via the user interface, user feedback data from the target participating user comprising an adjustment to the displayed text content of the at least one third component narrative. In additional or alternative implementations, the system can generate a fourth narrative summary using the user feedback data received from each target participating user. The system can also be configured to display the fourth narrative summary for the captured interaction at the user interface of each participating user.

In other implementations, the system can be configured to access at least one evaluation criterion corresponding to one or more content requirements for the generated third narrative summary. In response to determining that the contents of the third narrative summary fail to satisfy the at least one evaluation criterion, the system can generate, via a generative machine learning model, a fourth narrative summary comprising at least one fourth component narrative that satisfies the at least one evaluation criterion. Accordingly, the system can display the fourth narrative summary for the captured interaction at the user interface of each participating user.

Suitable Computing Environments

Figure 7:
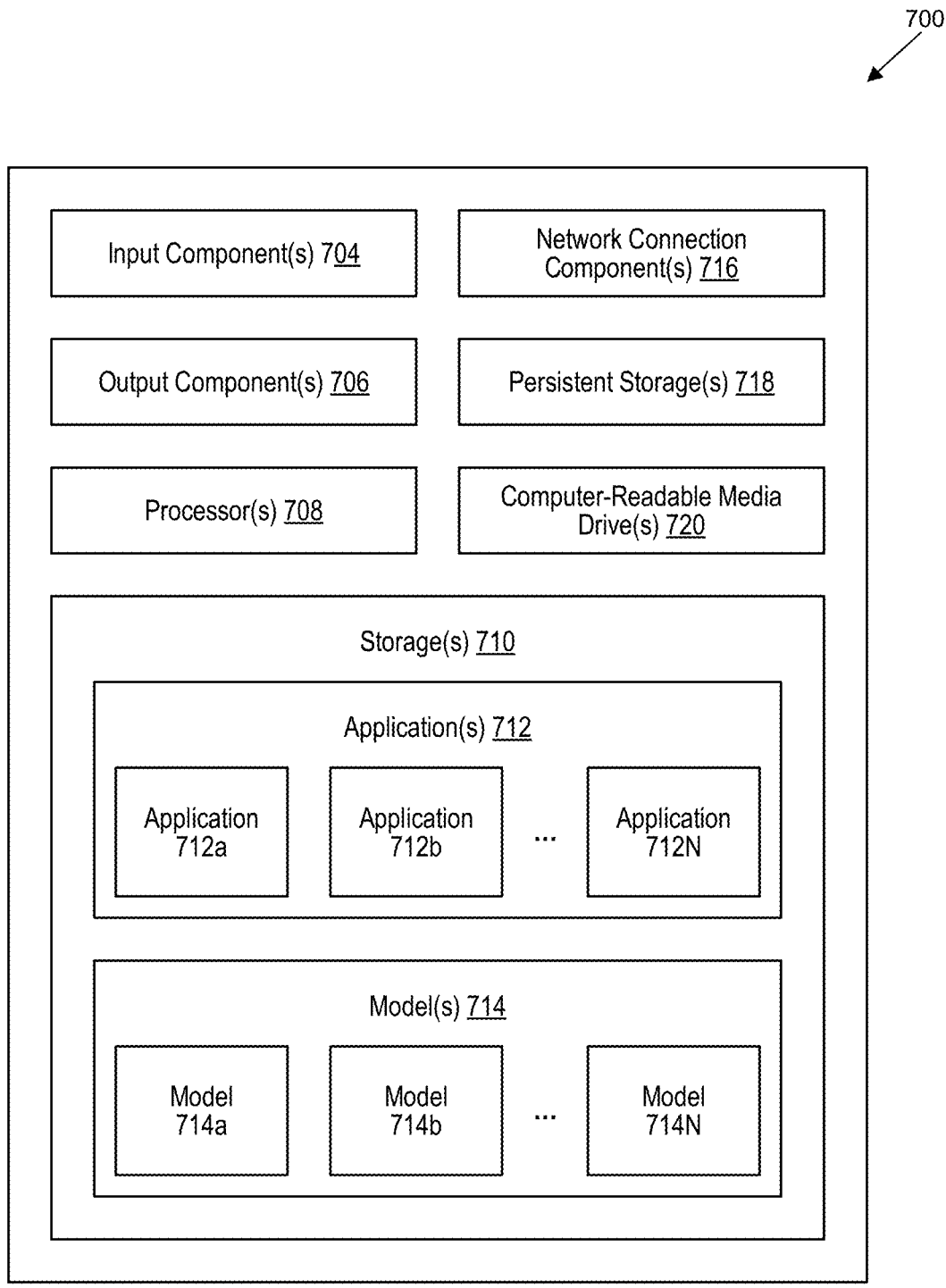
FIG. 7 is a block diagram that illustrates example components incorporated in at least some of the computer systems and other devices on which the disclosed system operates.

FIG. 7 is a block diagram that illustrates example components incorporated in at least some of the computer systems and other devices on which the disclosed system operates. In various implementations, these computer systems and other device(s) 700 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 704, including keyboards, microphones, image sensors, touch screens, buttons, touch screens, track pads, mice, CD drives, DVD drives, 3.5 mm input jack, HDMI input connections, VGA input connections, USB input connections, or other computing input components; output components 706, including display screens (e.g., LCD, OLED, CRT, etc.), speakers, 3.5 mm output jack, lights, LED's, haptic motors, or other output-related components; processor(s) 708, including a central processing unit (CPU) for executing computer programs, a graphical processing unit (GPU) for executing computer graphic programs and handling computing graphical elements; storage(s) 710, including at least one computer memory for storing programs (e.g., application(s) 712, model(s) 714, and other programs) and data while they are being used, including the facility and associated data, an operating system including a kernel, and device drivers; a network connection component(s) 716 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 718, such as a hard drive or flash drive for persistently storing programs and data; and computer-readable media drives 720 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility may be implemented using devices of various types and configurations, and having various components.

Figure 8:
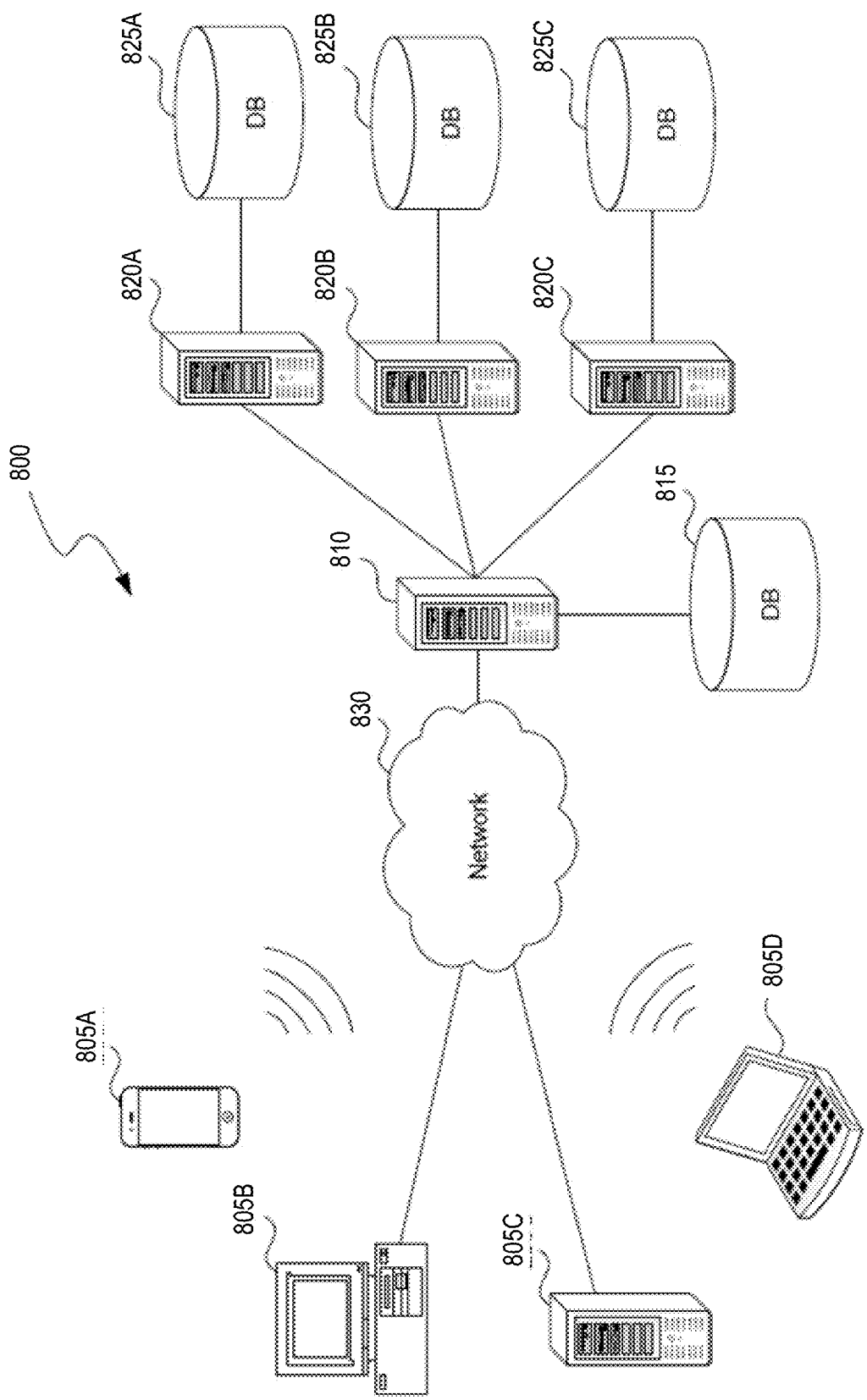
FIG. 8 is a block diagram illustrating an overview of a computing environment in which some implementations of the disclosed technology may operate.

FIG. 8 is a block diagram illustrating an overview of a computing environment 800 in which some implementations of the disclosed technology may operate. In some implementations, environment 800 includes one or more client computing devices 805A-D, examples of which can host the system 100. For example, the computing devices 805A-D can comprise distributed entities A-D, respectively. Client computing devices 805 operate in a networked environment using logical connections 810 through network 830 to one or more remote computers, such as a server computing device. In some implementations, client computing devices 805 may correspond to computing system or device 700 of FIG. 7.

In some implementations, server computing device 810 can be an edge server which receives client requests and coordinates fulfillment of those requests through other servers, such as servers 820A-C. In some implementations, server computing devices 810 and 820 comprise computing systems, such as the system 100. Though each server computing device 810 and 820 is displayed logically as a single server, server computing devices can each be a distributed computing environment encompassing multiple computing devices located at the same or at geographically disparate physical locations. In some implementations, each server computing device 820 corresponds to a group of servers.

Client computing devices 805 and server computing devices 810 and 820 can each act as a server or client to other server or client devices. In some implementations, server computing devices 810, 820A-C connect to a corresponding database 815, 825A-C. As discussed above, each server 820 can correspond to a group of servers, and each of these servers can share a database or can have its own database. Databases 815 and 825 warehouse (e.g., store) information such model data (e.g., retrieval augmented generation), training data, test data, validation data, one or more machine learning models, predefined ranges, predefined thresholds, error thresholds, graphical representations, recorded interaction information (e.g., an audio signal data, an audio transcript, a mapping between portions of audio to participant users, an initial narrative summary of recorded interaction, prior recorded interaction information, and/or the like), narrative summary information (e.g., a set of user feedback data, prior versions of narrative summaries, a mapping between portions of narrative summary and assigned users, and/or the like), participant user information (e.g., prior recorded interaction roles, communication preferences, and/or the like), industry standard narrative guidelines, predetermined narrative rules, self-executing evaluation agent data, or other information.

The one or more machine learning models can include supervised learning models, unsupervised learning models, semi-supervised learning models, reinforcement learning models, and/or generative machine learning models (e.g., large language models). Examples of machine learning models suitable for use with the present technology include, but are not limited to: regression algorithms (e.g., ordinary least squares regression, linear regression, logistic regression, stepwise regression, multivariate adaptive regression splines, locally estimated scatterplot smoothing), instance-based algorithms (e.g., k-nearest neighbor, learning vector quantization, self-organizing map, locally weighted learning, support vector machines), regularization algorithms (e.g., ridge regression, least absolute shrinkage and selection operator, elastic net, least-angle regression), decision tree algorithms (e.g., classification and regression trees, Iterative Dichotomiser 3 (ID3), C4.5, C5.0, chi-squared automatic interaction detection, decision stump, M5, conditional decision trees), Bayesian algorithms (e.g., naïve Bayes, Gaussian naïve Bayes, multinomial naïve Bayes, averaged one-dependence estimators, Bayesian belief networks, Bayesian networks), clustering algorithms (e.g., k-means, k-medians, expectation maximization, hierarchical clustering), association rule learning algorithms (e.g., apriori algorithm, ECLAT algorithm), artificial neural networks (e.g., perceptron, multilayer perceptrons, back-propagation, stochastic gradient descent, Hopfield networks, radial basis function networks), deep learning algorithms (e.g., convolutional neural networks, recurrent neural networks, long short-term memory networks, stacked auto-encoders, deep Boltzmann machines, deep belief networks), dimensionality reduction algorithms (e.g., principle component analysis, principle component regression, partial least squares regression, Sammon mapping, multidimensional scaling, projection pursuit, discriminant analysis), time series forecasting algorithms (e.g., exponential smoothing, autoregressive models, autoregressive with exogenous input (ARX) models, autoregressive moving average (ARMA) models, autoregressive moving average with exogenous inputs (ARMAX) models, autoregressive integrated moving average (ARIMA) models, autoregressive conditional heteroskedasticity (ARCH) models), blackboard machine learning models, ensemble algorithms (e.g., boosting, bootstrapped aggregation, AdaBoost, blending, stacking, gradient boosting machines, gradient boosted trees, random forest), natural language processing (NLP) models (e.g., recurrent neural networks, transformers, sentiment analysis, audio-to-text, text summarization, and/or the like), and/or large language models (e.g., transformers, encoder-decoder, question-answer models, and/or the like).

In some implementations, the one or more machine learning models can be trained on training data or a training set. The training data or training set can be created by generating pairs of features (e.g., feature vectors) and/or ground-truth labels/values based on any of the data stored in databases 815 and 825. During training, the machine learning models can be adjusted or modified to fit the models to the training data by, for example, adjusting or modifying model parameters, such as weights and/or biases, so as to minimize some error measure (e.g., a difference between a predicted value and an actual/ground-truth value) over the training data. The error measure can be evaluated using one or more loss functions. Examples of loss functions that can be used include, but are not limited to, cross-entropy loss, log loss, hinge loss, mean square error, quadratic loss, L2 loss, mean absolute loss, L1 loss, Huber loss, smooth mean absolute error, log-cosh loss, or quantile loss. The trained machine learning models can then be applied to test data or validation data (e.g., holdout dataset) to generate predictions (e.g., predicted values or labels). The test data or validation data can also come from data that is stored in databases 815 and 825 (e.g., unlabeled data to generate predictions for). In some implementations, the machine learning models can be retrained to further modify/adjust model parameters and improve model performance. The machine learning models can be retrained on existing and/or new training data, training data, or validation data so as to fine-tune the model parameters to better fit the data and yield a different error measure over the data (e.g., further minimization of the error, or to increase the error to prevent overfitting). More specifically, the model can be further adjusted or modified (e.g., fine-tuned model parameters such as weights and/or biases) so as to alter the yielded error measure. Such retraining can be performed iteratively whenever it is determined that adjustments or modifications to the machine learning models are desirable.

Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN) but can also be other wired or wireless networks. Network 830 may be the Internet or some other public or private network. Client computing devices 805 can be connected to network 830 through a network interface, such as by wired or wireless communication. While the connections between server 810 and servers 820 are shown as separate connections, these connections can be any kind of local, wide area, wired, or wireless network, including network 830 or a separate public or private network.

Machine Learning Model(s)

Figure 9:
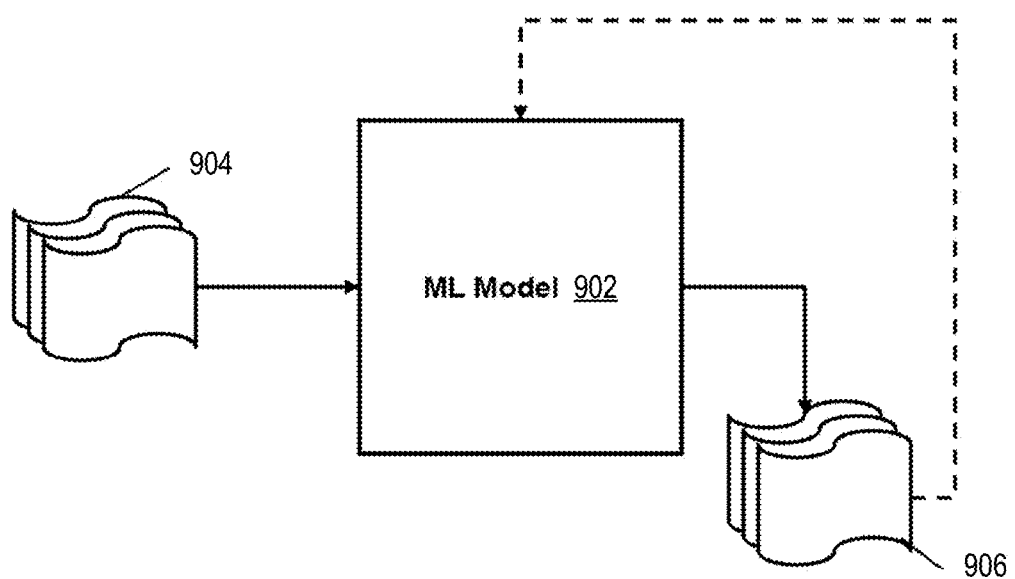
FIG. 9 is a diagram illustrating a machine learning model, in accordance with some implementations of the present technology.

FIG. 9 is an illustrative diagram illustrating a machine learning model, in accordance with some implementations of the present technology. In some implementations, machine learning model 902 can be part of, or work in conjunction with logical component 102. For example, logical component 102 can be a computer program that can use information obtained from machine learning model 902. In other implementations, machine learning model 902 may represent logical component 102, in accordance with some implementations of the present technology.

In some implementations, the machine learning model 902 can include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some implementations, each individual neural unit may have a summation function which combines the values of all its inputs together. In some implementations, each connection (or the neural unit itself)

may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some implementations, neural networks may include multiple layers (e.g., where a signal path traverses from front layers to back layers). In some implementations, back propagation techniques may be utilized by the neural networks, where forward stimulation is used to reset weights on the "front" neural units. In some implementations, stimulation and inhibition for neural networks may be more free-flowing, with connections interacting in a more chaotic and complex fashion.

As an example, with respect to FIG. 9, machine learning model 902 can take inputs 904 and provide outputs 906. In one use case, outputs 906 may be fed back to machine learning model 902 as input to train machine learning model 902 (e.g., alone or in conjunction with user indications of the accuracy of outputs 906, labels associated with the inputs, or with other reference feedback information). In another use case, machine learning model 902 may update its configurations (e.g., weights, biases, or other parameters) based on its assessment of its prediction (e.g., outputs 906) and reference feedback information (e.g., user indication of accuracy, reference labels, or other information). In another use case, where machine learning model 902 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 902 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 10:
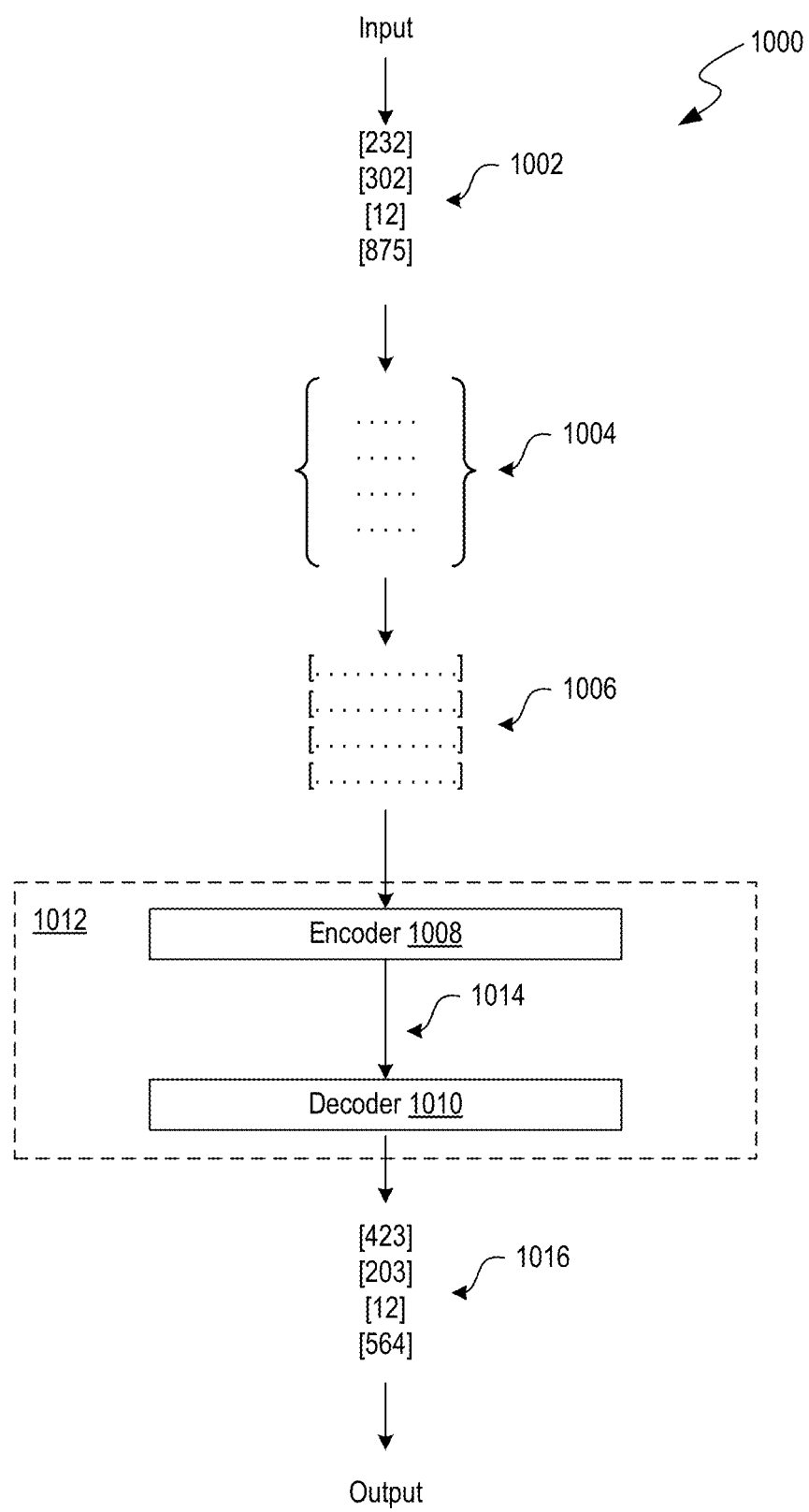
FIG. 10 is a block diagram of an example transformer that can implement aspects of the present technology.

FIG. 10 is a block diagram of an example transformer 1012 that can implement aspects of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 1012 includes an encoder 1008 (which can comprise one or more encoder layers/blocks connected in series) and a decoder 1010 (which can comprise one or more decoder layers/blocks connected in series). Generally, the encoder 1008 and the decoder 1010 each include a plurality of neural network layers, at least one of which can be a self-attention layer. The parameters of the neural network layers can be referred to as the parameters of the language model.

The transformer 1012 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 1012 is trained to perform certain functions on other input formats than natural language input. For example, the input can include objects, images, audio content, or video content, or a combination thereof.

The transformer 1012 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 10 illustrates an example of how the transformer 1012 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 10, a short sequence of tokens 1002 corresponding to the input text is illustrated as input to the transformer 1012. Tokenization of the text sequence into the tokens 1002 can be performed by some pre-processing tokenization module such as, for example, a byte-pair encoding tokenizer (the "pre" referring to the tokenization occurring prior to the processing of the tokenized input by the LLM), which is not shown in FIG. 10 for simplicity. In general, the token sequence that is inputted to the transformer 1012 can be of any length up to a maximum length defined based on the dimensions of the transformer 1012. Each token 1002 in the token sequence is converted into an embedding vector 1006 (also referred to simply as an embedding 1006). An embedding 1006 is a learned numerical representation (such as, for example, a vector) of a token that captures some semantic meaning of the text segment represented by the token 1002. The embedding 1006 represents the text segment corresponding to the token 1002 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 1006 corresponding to the "write" token will be closer to another embedding corresponding to the "jot down" token in the vector space as compared to the distance between the embedding 1006 corresponding to the "write" token and another embedding corresponding to the "summary" token.

The vector space can be defined by the dimensions and values of the embedding vectors. Various techniques can be used to convert a token 1002 to an embedding 1006. For example, another trained ML model can be used to convert the token 1002 into an embedding 1006. In particular, another trained ML model can be used to convert the token 1002 into an embedding 1006 in a way that encodes additional information into the embedding 1006 (e.g., a trained ML model can encode positional information about the position of the token 1002 in the text sequence into the embedding 1006). In some examples, the numerical value of the token 1002 can be used to look up the corresponding embedding in an embedding matrix 1004 (which can be learned during training of the transformer 1012).

The generated embeddings 1006 are input into the encoder 1008. The encoder 1008 serves to encode the embeddings 1006 into feature vectors 1014 that represent the latent features of the embeddings 1006. The encoder 1008 can encode positional information (i.e., information about the sequence of the input) in the feature vectors 1014. The feature vectors 1014 can have very high dimensionality (e.g., on the order of thousands or tens of thousands), with each element in a feature vector 1014 corresponding to a respective feature. The numerical weight of each element in a feature vector 1014 represents the importance of the corresponding feature. The space of all possible feature vectors 1014 that can be generated by the encoder 1008 can be referred to as the latent space or feature space.

Conceptually, the decoder 1010 is designed to map the features represented by the feature vectors 1014 into meaningful output, which can depend on the task that was assigned to the transformer 1012. For example, if the transformer 1012 is used for a translation task, the decoder 1010 can map the feature vectors 1014 into text output in a target language different from the language of the original tokens 1002. Generally, in a generative language model, the decoder 1010 serves to decode the feature vectors 1014 into a sequence of tokens. The decoder 1010 can generate output tokens 1016 one by one. Each output token 1016 can be fed back as input to the decoder 1010 in order to generate the next output token 1016. By feeding back the generated output and applying self-attention, the decoder 1010 is able to generate a sequence of output tokens 1016 that has sequential meaning (e.g., the resulting output text sequence is understandable as a sentence and obeys grammatical rules). The decoder 1010 can generate output tokens 1016 until a special [EOT] token (indicating the end of the text) is generated. The resulting sequence of output tokens 1016 can then be converted to a text sequence in post-processing. For example, each output token 1016 can be an integer number that corresponds to a vocabulary index. By looking up the text segment using the vocabulary index, the text segment corresponding to each output token 1016 can be retrieved, the text segments can be concatenated together, and the final output text sequence can be obtained.

In some examples, the input provided to the transformer 1012 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Computer System

Figure 11:
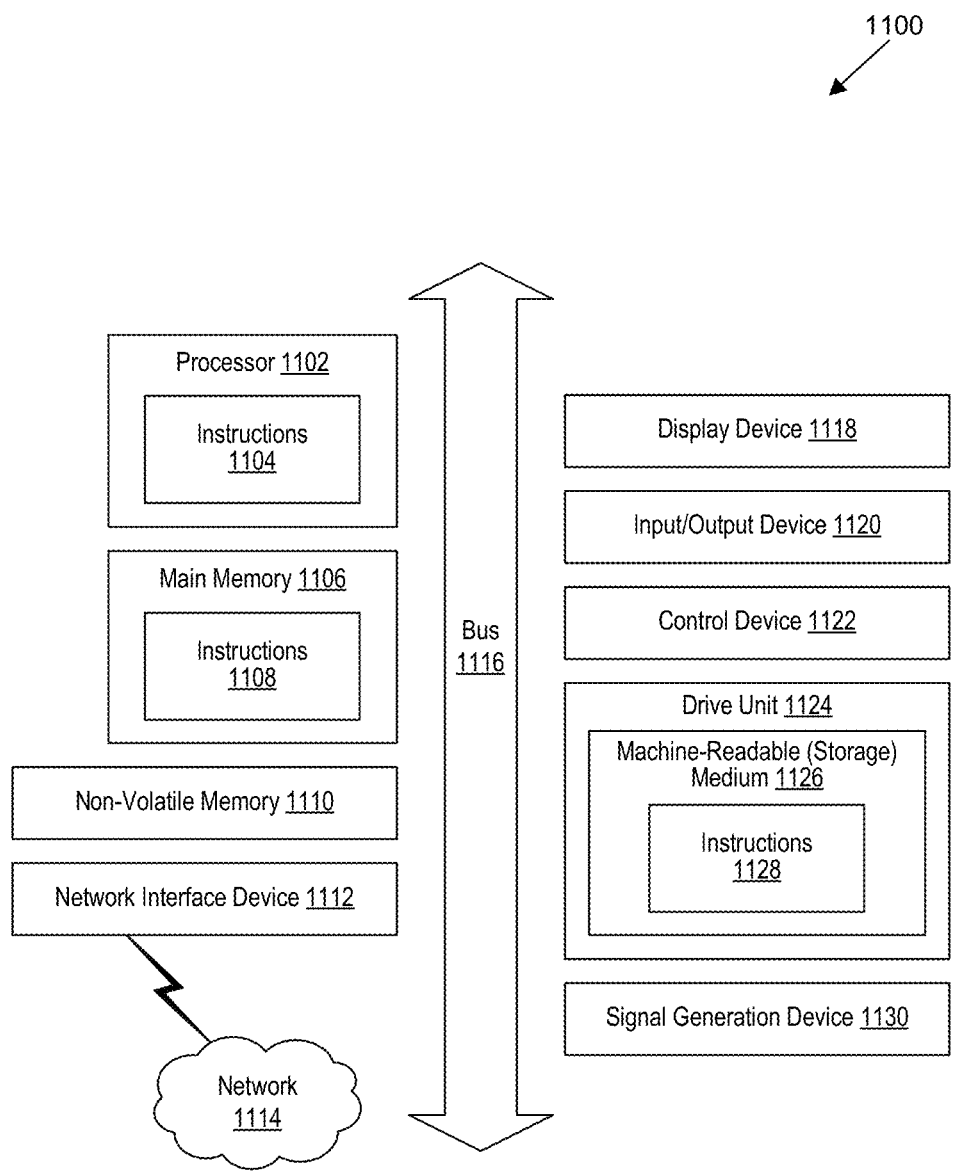
FIG. 11 is a block diagram that illustrates an example of a computer system in which at least some operations described herein can be implemented.

FIG. 11 is a block diagram that illustrates an example of a computer system 1100 in which at least some operations described herein can be implemented. As shown, the computer system 1100 can include: one or more processors 1102, main memory 1106, non-volatile memory 1110, a network interface device 1112, a video display device 1118, an input/output device 1120, a control device 1122 (e.g., keyboard and pointing device), a drive unit 1124 that includes a machine-readable (storage) medium 1126, and a signal generation device 1130 that are communicatively connected to a bus 1116. The bus 1116 represents one or more physical buses and/or point-to-point connections that are connected by appropriate bridges, adapters, or controllers. Various common components (e.g., cache memory) are omitted from FIG. 11 for brevity. Instead, the computer system 1100 is intended to illustrate a hardware device on which components illustrated or described relative to the examples of the figures and any other components described in this specification can be implemented.

The computer system 1100 can take any suitable physical form. For example, the computing system 1100 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1100. In some implementations, the computer system 1100 can be an embedded computer system, a system-on-chip (SOC), a single-board computer system (SBC), or a distributed system such as a mesh of computer systems, or it can include one or more cloud components in one or more networks. Where appropriate, one or more computer systems 1100 can perform operations in real time, in near real time, or in batch mode.

The network interface device 1112 enables the computing system 1100 to mediate data in a network 1114 with an entity that is external to the computing system 1100 through any communication protocol supported by the computing system 1100 and the external entity. Examples of the network interface device 1112 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1106, non-volatile memory 1110, machine-readable medium 1126) can be local, remote, or distributed. Although shown as a single medium, the machine-readable medium 1126 can include multiple media (e.g., a centralized/distributed database and/or associated caches and servers) that store one or more sets of instructions 1128. The machine-readable medium 1126 can include any medium that is capable of storing, encoding, or carrying a set of instructions for execution by the computing system 1100. The machine-readable medium 1126 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1110, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in computing device(s). When read and executed by the processor 1102, the instruction(s) cause the computing system 1100 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A method for evaluating transcripts generated using speech to text transcription models, the method comprising:
    accessing audio data of a captured interaction involving one or more participating users of a digital conference tool;
    receiving a first narrative summary of the captured interaction comprising a set of first component narratives each corresponding to and associated with at least one participating user of the digital conference tool;
    generating, via a machine learning model, a second narrative summary comprising a set of second component narratives using: (1) the accessed audio data and (2) the first narrative summary;
    for each participating user of the captured interaction:
        identifying, from the second narrative summary, at least one second component narrative among the set of second component narratives corresponding to the participating user,
        transmitting, for display at a user interface of the participating user, the second component narratives of the second narrative summary,
            wherein the at least one second component narrative is configured to be displayed via a configurable interface element enabling the participating user to adjust text content of the at least one component narrative,
            wherein second component narratives not corresponding to the participating user are configured to be displayed via a non-configurable interface element prohibiting the participating user from adjusting text content of the second component narratives not corresponding to the participating user, and
        receiving, via the user interface of the participating user, user feedback data comprising an adjustment to the displayed text content of the at least one second component narrative;
    generating a third narrative summary using the user feedback data received from each participating user of the captured interaction; and
    transmitting, for display at the user interface of each participating user, the third narrative summary for the captured interaction.

2. The method of claim 1, wherein the machine learning model is a generative machine learning model, and wherein the method further comprises:
    prompting, using the accessed audio data and the first narrative summary, the generative machine learning model to create at least one component narrative of the second narrative summary that corresponds to a subset of first component narratives.

3. The method of claim 1, wherein the first narrative summary of the captured interaction is generated using a second machine learning model, and wherein the machine learning model for generating the second narrative summary is different from the second machine learning model.

4. The method of claim 1, further comprising:
    selecting, from the captured interaction, at least one participating user of the digital conference tool;
    identifying one or more second component narratives corresponding to the at least one participating user;
    determining at least one portion of the accessed audio data corresponding to the at least one participating user; and
    updating, via the second generative machine learning model, the one or more second component narratives based on the determined at least one portion of the accessed audio data and text content of the one or more component narratives.

5. The method of claim 1,
    wherein the at least one second component narrative is further configured to be displayed with a visual marking indicating text content the participating user is authorized to adjust, and
    wherein the visual marking separates the at least one second component narrative from displayed second component narratives not corresponding to the participating user.

6. The method of claim 1, wherein the user feedback data comprises a set of commentary narratives corresponding to at least one of:

the at least one second component narrative corresponding to the participating user, or at least one component narrative of the second narrative summary not corresponding to the participating user.

7. The method of claim 6, wherein each commentary narrative comprises an indication of content error, content clarification, a misidentified participating user, or a combination thereof.

8. The method of claim 1, wherein the participating user is a first participating user of the captured interaction, and wherein the method further comprises:

receiving from the first participating user, via the user interface, a selection for reassigning the at least one second component narrative from the first participating user to a second participating user of the captured interaction, wherein the at least one second component narrative does not correspond to the second participating user; and transmitting, for display at the user interface of the second participating user, the at least one second component narrative, wherein the at least one second component narrative is further configured to be displayed via a configurable interface element enabling the second participating user to adjust text content of the at least one component narrative.

9. The method of claim 1, further comprising:

accessing, from a remote database, a first version of the second narrative summary, wherein the received user feedback data comprise proposed adjustments to second component narratives of the first version of the second narrative summary;

transmitting, for display at a user interface of an authorized user, the first version of the second narrative summary and the received user feedback data, wherein the received user feedback data is configured to be displayed via a visual interface element comprising one or more visual markings representative of the proposed adjustments to second component narratives of the first version of the second narrative summary;

responsive to receiving an authorization signal from the authorized user for incorporating the received user feedback data into the second narrative summary, generating a second version of the second narrative summary, wherein the second version of the second narrative summary applies the proposed adjustments to second component narratives of the first version of the second narrative summary; and storing, at the remote database, the second version of the second narrative summary.

10. The method of claim 9, further comprising:

accessing a set of identifiers for the second version of the second narrative summary, the set of identifiers comprising at least one of:

a timestamp, a version control number, an identifier for the authorized user, an identifier of a participating user, contents of the first version of the second narrative summary, contents of the second version of the second narrative summary, or contents of the user feedback data; and generating, using the accessed set of identifiers, a unique authenticity token verifying the generation of the second version of the second narrative summary.

11. The method of claim 1, further comprising:

receiving, from the one or more participating users, a set of validation ratings for the third narrative summary, each validation rating indicating approximate content accuracy for third component narratives of the third narrative summary;

responsive to the set of validation ratings exceeding an inaccuracy threshold, identifying a set of target participating users corresponding to critical validation ratings;

for each target participating user:

identifying, using the critical validation ratings, at least one third component narrative of the third narrative summary corresponding to the target participating user, transmitting, for display at a user interface of the target participating user, the at least one third component narrative, and receiving, via the user interface of the target participating user, user feedback data comprising an adjustment to the displayed text content of the at least one third component narrative;

generating a fourth narrative summary using the user feedback data received from each target participating user; and transmitting for display at the user interface of each participating user, the fourth narrative summary for the captured interaction.

12. The method of claim 1, further comprising:

accessing at least one evaluation criterion corresponding to one or more content requirements for the generated third narrative summary;

responsive to contents of the third narrative summary failing to satisfy at the least one evaluation criterion, generating, via a third generative machine learning model, a fourth narrative summary comprising at least one fourth component narrative that satisfies the at least one evaluation criterion; and transmitting, for display at the user interface of each participating user, the fourth narrative summary for the captured interaction.

13. The method of claim 1, further comprising:

storing the received user feedback data at a distributed ledger, wherein entries in the distributed ledger corresponds component narratives and associated metadata.

14. A non-transitory, computer-readable storage medium comprising instructions recorded thereon, wherein the instructions when executed by at least one data processor of a system, cause the system to:

access audio data of a captured interaction involving one or more participating users of a digital conference tool;

receive a first narrative summary of the captured interaction comprising a set of first component narratives each corresponding to and associated with at least one participating user of the digital conference tool;

generate, via a machine learning model, a second narrative summary comprising a set of second component narratives using: (1) the accessed audio data and (2) the first narrative summary;

for each participating user of the captured interaction:
  identify, from the second narrative summary, at least one second component narrative among the set of second component narratives corresponding to the participating user,
  transmit, for display at a user interface of the participating user, the second component narratives of the second narrative summary,
    wherein the at least one second component narrative is configured to be displayed via a configurable interface element enabling the participating user to adjust text content of the at least one component narrative,
    wherein second component narratives not corresponding to the participating user are configured to be displayed via a non-configurable interface element prohibiting the participating user from adjusting text content of the second component narratives not corresponding to the participating user, and
  receive, via the user interface of the participating user, user feedback data comprising an adjustment to the displayed text content of the at least one second component narrative;
generate a third narrative summary using the user feedback data received from each participating user of the captured interaction; and
transmit, for display at the user interface of each participating user, the third narrative summary for the captured interaction.

15. The non-transitory, computer-readable storage medium of claim 14,
  wherein the at least one second component narrative is further configured to be displayed with a visual marking indicating text content the participating user is authorized to adjust, and
  wherein the visual marking separates the at least one second component narrative from displayed second component narratives not corresponding to the participating user.

16. The non-transitory, computer-readable storage medium of claim 14, wherein the user feedback data comprises a set of commentary narratives corresponding to at least one of:
  the at least one second component narrative corresponding to the participating user, or
  at least one component narrative of the second narrative summary not corresponding to the participating user.

17. The non-transitory, computer-readable storage medium of claim 14, wherein the participating user is a first participating user of the captured interaction, and wherein the instructions further cause the system to:
  receive from the first participating user, via the user interface, a selection for reassigning the at least one second component narrative from the first participating user to a second participating user of the captured interaction,
    wherein the at least one second component narrative does not correspond to the second participating user; and
  transmit, for display at the user interface of the second participating user, the at least one second component narrative,
    wherein the at least one second component narrative is further configured to be displayed via a configurable interface element enabling the second participating user to adjust text content of the at least one component narrative.

18. The non-transitory, computer-readable storage medium of claim 14, wherein the instructions further cause the system to:
  access, from a remote database, a first version of the second narrative summary,
    wherein the received user feedback data comprise proposed adjustments to second component narratives of the first version of the second narrative summary;
  transmit, for display at a user interface of an authorized user, the first version of the second narrative summary and the received user feedback data,
    wherein the received user feedback data is configured to be displayed via a visual interface element comprising one or more visual markings representative of the proposed adjustments to second component narratives of the first version of the second narrative summary;
  responsive to receiving an authorization signal from the authorized user for incorporating the received user feedback data into the second narrative summary, generate a second version of the second narrative summary,
    wherein the second version of the second narrative summary applies the proposed adjustments to second component narratives of the first version of the second narrative summary; and
  store, at the remote database, the second version of the second narrative summary.

19. The non-transitory, computer-readable storage medium of claim 18, wherein the instructions further cause the system to:
  access a set of identifiers for the second version of the second narrative summary, the set of identifiers comprising at least one of:
    a timestamp,
    a version control number,
    an identifier for the authorized user,
    an identifier of a participating user,
    contents of the first version of the second narrative summary,
    contents of the second version of the second narrative summary, or
    contents of the user feedback data; and
  generate, using the accessed set of identifiers, a unique authenticity token verifying the generation of the second version of the second narrative summary.

20. A system comprising:
at least one hardware processor; and
at least one non-transitory memory storing instructions, which, when executed by the at least one hardware processor, cause the system to:
  access audio data of a captured interaction involving one or more participating users of a digital conference tool;
  receive a first narrative summary of the captured interaction comprising a set of first component narratives each corresponding to and associated with at least one participating user of the digital conference tool;
  generate, via a machine learning model, a second narrative summary comprising a set of second component narratives using: (1) the accessed audio data and (2) the first narrative summary;

for each participating user of the captured interaction:
- identify, from the second narrative summary, at least one second component narrative among the set of second component narratives corresponding to the participating user,
- transmit, for display at a user interface of the participating user, the second component narratives of the second narrative summary,
  - wherein the at least one second component narrative is configured to be displayed via a configurable interface element enabling the participating user to adjust text content of the at least one component narrative,
  - wherein second component narratives not corresponding to the participating user are configured to be displayed via a non-configurable interface element prohibiting the participating user from adjusting text content of the second component narratives not corresponding to the participating user, and
- receive, via the user interface of the participating user, user feedback data comprising an adjustment to the displayed text content of the at least one second component narrative;

generate a third narrative summary using the user feedback data received from each participating user of the captured interaction; and transmit, for display at the user interface of each participating user, the third narrative summary for the captured interaction.

* * * * *